(12) United States Patent
Lee et al.

(10) Patent No.: US 10,172,023 B2
(45) Date of Patent: ***Jan. 1, 2019

(54) METHOD FOR A CONFIGURATION ERROR MANAGEMENT FOR A SIDELINK RADIO BEARER AND DEVICE THEREFOR

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 91 days.

This patent is subject to a terminal disclaimer.

(21) Appl. No.: 15/306,057

(22) PCT Filed: Apr. 21, 2015

(86) PCT No.: PCT/KR2015/003963
§ 371 (c)(1),
(2) Date: Oct. 21, 2016

(87) PCT Pub. No.: WO2015/163668
PCT Pub. Date: Oct. 29, 2015

(65) Prior Publication Data
US 2017/0048011 A1    Feb. 16, 2017

Related U.S. Application Data

(60) Provisional application No. 61/984,047, filed on Apr. 25, 2014.

(51) Int. Cl.
*H04W 24/08* (2009.01)
*H04W 92/18* (2009.01)
(Continued)

(52) U.S. Cl.
CPC ............... *H04W 24/08* (2013.01); *H04L 1/16* (2013.01); *H04L 1/1607* (2013.01);
(Continued)

(58) Field of Classification Search
CPC ..... H04B 17/0082–17/364; H04L 1/12–1/248; H04L 41/0677; H04L 43/16;
(Continued)

(56) References Cited

U.S. PATENT DOCUMENTS

2002/0105971 A1 * 8/2002 Tourunen ................. H04L 1/06
370/469
2007/0232291 A1 10/2007 Rathonyi et al.
(Continued)

FOREIGN PATENT DOCUMENTS

WO    2009022803    2/2009
WO    2014026376    2/2014
WO    WO 2014026376 A1 * 2/2014 .......... H04W 76/023

OTHER PUBLICATIONS

PCT International Application No. PCT/KR2015/003965, Written Opinion of the International Searching Authority dated Jul. 14, 2015, 10 pages.
(Continued)

*Primary Examiner* — Timothy J Weidner
(74) *Attorney, Agent, or Firm* — Lee, Hong, Degerman, Kang & Waimey

(57) ABSTRACT

The present invention relates to a wireless communication system. More specifically, the present invention relates to a method and a device for a configuration error management for a sidelink radio bearer, the method comprising: receiving one or more D2D packets via a sidelink radio bearer, counting erroneous D2D packets among the one or more D2D packets, and detecting configuration error for the
(Continued)

sidelink radio bearer if a number of the counted erroneous D2D packets is equal to or larger than a threshold.

17 Claims, 19 Drawing Sheets

(51) Int. Cl.
    *H04W 88/02*     (2009.01)
    *H04W 80/02*     (2009.01)
    *H04W 24/10*     (2009.01)
    *H04W 76/19*     (2018.01)
    *H04W 76/11*     (2018.01)
    *H04W 4/80*     (2018.01)
    *H04W 4/70*     (2018.01)
    *H04W 4/50*     (2018.01)
    *H04L 29/08*     (2006.01)
    *H04L 1/18*     (2006.01)
    *H04L 1/16*     (2006.01)

(52) U.S. Cl.
    CPC .......... *H04L 1/1829* (2013.01); *H04L 1/1867* (2013.01); *H04L 67/104* (2013.01); *H04W 4/50* (2018.02); *H04W 4/70* (2018.02); *H04W 4/80* (2018.02); *H04W 24/10* (2013.01); *H04W 76/11* (2018.02); *H04W 76/19* (2018.02); *H04W 80/02* (2013.01); *H04W 88/02* (2013.01); *H04W 92/18* (2013.01)

(58) Field of Classification Search
    CPC .... H04L 67/104–67/1093; H04W 4/18–4/203; H04W 4/50; H04W 4/70; H04W 4/80; H04W 24/02–24/10; H04W 28/02–28/14; H04W 76/10–76/38; H04W 80/02; H04W 88/02; H04W 88/04; H04W 88/06; H04W 92/18; Y02D 70/00; Y02D 70/21
    See application file for complete search history.

(56) References Cited

U.S. PATENT DOCUMENTS

| | | | |
|---|---|---|---|
| 2009/0320100 A1* | 12/2009 | Kitazoe | H04L 1/1607 709/227 |
| 2010/0165901 A1 | 7/2010 | Kim | |
| 2011/0019532 A1 | 1/2011 | Jung et al. | |
| 2012/0207011 A1 | 8/2012 | Franklin et al. | |
| 2012/0207100 A1 | 8/2012 | Hakola et al. | |
| 2013/0003523 A1 | 1/2013 | Singh et al. | |
| 2013/0053052 A1 | 2/2013 | Ke et al. | |
| 2013/0088960 A1 | 4/2013 | Bi et al. | |
| 2013/0128797 A1 | 5/2013 | Newberg et al. | |
| 2013/0242765 A1 | 9/2013 | Kubota et al. | |
| 2013/0272182 A1 | 10/2013 | Li et al. | |
| 2013/0324114 A1 | 12/2013 | Raghothaman et al. | |
| 2014/0098657 A1 | 4/2014 | Kubota et al. | |
| 2015/0195863 A1 | 7/2015 | Reznik et al. | |
| 2015/0312892 A1 | 10/2015 | Liu et al. | |
| 2016/0183241 A1* | 6/2016 | Lee | H04W 76/14 455/425 |
| 2016/0374139 A1 | 12/2016 | Chen et al. | |
| 2017/0041818 A1* | 2/2017 | Lee | H04W 4/001 370/252 |
| 2017/0048643 A1* | 2/2017 | Lee | H04W 4/001 370/252 |
| 2017/0127219 A1 | 5/2017 | Schmidt et al. | |

OTHER PUBLICATIONS

PCT International Application No. PCT/KR2015/003964, Written Opinion of the International Searching Authority dated Jul. 20, 2015, 14 pages.
PCT International Application No. PCT/KR2015/003963, Written Opinion of the International Searching Authority dated Jul. 28, 2015, 11 pages.
United States Patent and Trademark Office U.S. Appl. No. 15/306,311, Office Action dated Feb. 8, 2018, 21 pages.

* cited by examiner (a) Control-Plane Protocol Stack (b) User-Plane Protocol Stack

FIG. 15E

| R1 | R1 | R1 | FI | E | SN | Oct 1 |
|----|----|----|----|----|----|-------|
| SN ||||||  Oct 2 |
| E | LI$_1$ ||||| Oct 3 |
| LI$_1$ ||| E | LI$_2$ (if K>=3) || Oct 4 |
| LI$_2$ |||||| Oct 5 |
| ... |||||| |
| E | LI$_{K-2}$ ||||| Oct [2.5+1.5*K-4] |
| LI$_{K-2}$ ||| E | LI$_{K-1}$ || Oct [2.5+1.5*K-3] |
| LI$_{K-1}$ |||||| Oct [2.5+1.5*K-2] |
| E | LI$_K$ ||||| Oct [2.5+1.5*K-1] |
| LI$_K$ ||| Padding ||| Oct [2.5+1.5*K] |
| Data |||||| Oct [2.5+1.5*K+1] |
| ... |||||| |
| |||||| Oct N |

Present if K >= 3: rows from E/LI$_{K-2}$ through LI$_{K-1}$.

FIG. 15F

| R1 | R1 | R1 | FI | E | SN | Oct 1 |
|----|----|----|----|----|----|-------|
| SN |||||| Oct 2 |
| E | LI$_1$ ||||| Oct 3 |
| LI$_1$ ||| E | LI$_2$ || Oct 4 |
| LI$_2$ |||||| Oct 5 |
| ... |||||| |
| E | LI$_{K-1}$ ||||| Oct [2+1.5*K-2] |
| LI$_{K-1}$ ||| E | LI$_K$ || Oct [2+1.5*K-1] |
| LI$_K$ |||||| Oct [2+1.5*K] |
| Data |||||| Oct [2+1.5*K+1] |
| ... |||||| |
| |||||| Oct N |

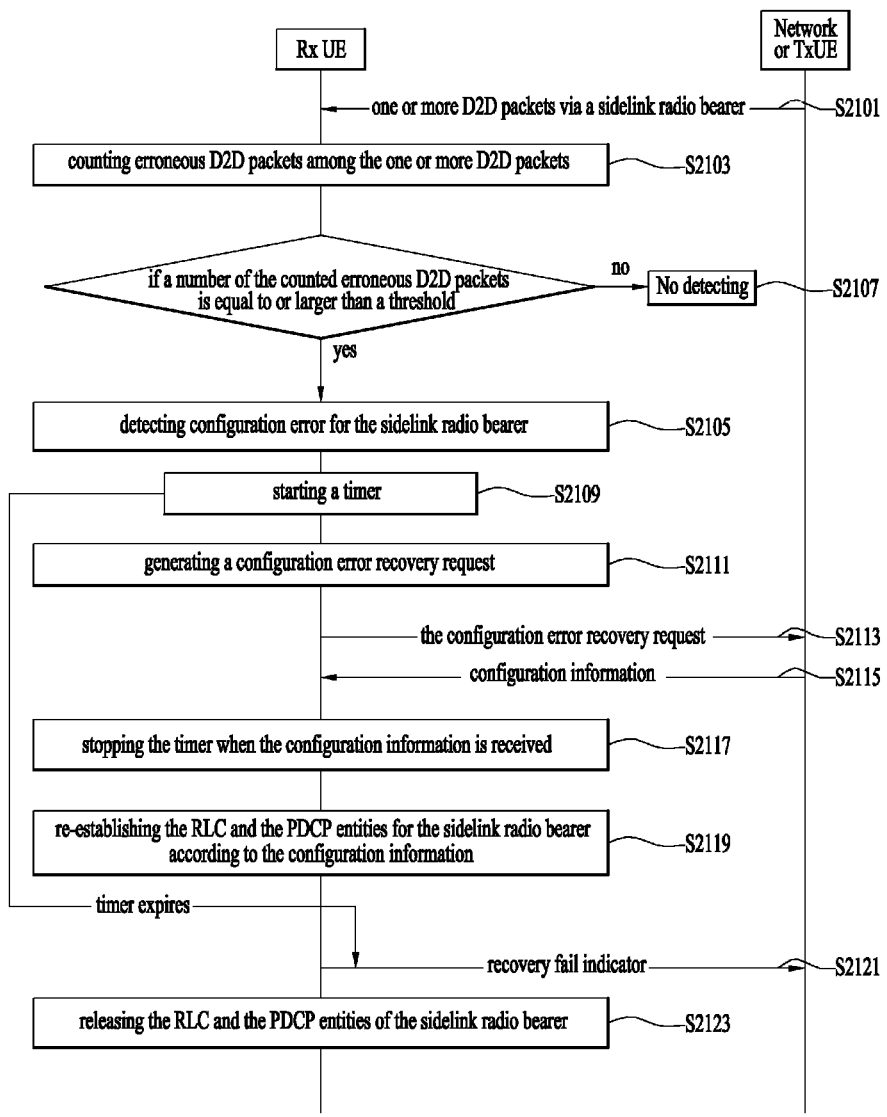

METHOD FOR A CONFIGURATION ERROR MANAGEMENT FOR A SIDELINK RADIO BEARER AND DEVICE THEREFOR

CROSS-REFERENCE TO RELATED APPLICATIONS

This application is the National Stage filing under 35 U.S.C. 371 of International Application No. PCT/KR2015/003963, filed on Apr. 21, 2015, which claims the benefit of U.S. Provisional Application No. 61/984,047, filed on Apr. 25, 2014, the contents of which are all hereby incorporated by reference herein in their entirety.

TECHNICAL FIELD

The present invention relates to a wireless communication system and, more particularly, to a method for a configuration error management for a sidelink radio bearer and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Device to device (D2D) communication refers to the distributed communication technology that directly transfers traffic between adjacent nodes without using infrastructure such as a base station. In a D2D communication environment, each node such as a portable terminal discovers user equipment physically adjacent thereto and transmits traffic after setting communication session. In this way, since D2D communication may solve traffic overload by distributing traffic concentrated into the base station, the D2D communication may have received attention as the element technology of the next generation mobile communication technology after 4G. For this reason, the standard institute such as 3GPP or IEEE has proceeded to establish the D2D communication standard on the basis of LTE-A or Wi-Fi, and Qualcomm has developed their own D2D communication technology.

It is expected that the D2D communication contributes to increase throughput of a mobile communication system and create new communication services. Also, the D2D communication may support proximity based social network services or network game services. The problem of link of a user equipment located at a shade zone may be solved by using a D2D link as a relay. In this way, it is expected that the D2D technology will provide new services in various fields.

The D2D communication technologies such as infrared communication, ZigBee, radio frequency identification (RFID) and near field communications (NFC) based on the RFID have been already used. However, since these technologies support communication only of a specific object within a limited distance (about 1 m), it is difficult for the technologies to be regarded as the D2D communication technologies strictly.

Although the D2D communication has been described as above, details of a method for transmitting data from a plurality of D2D user equipments with the same resource have not been suggested.

DISCLOSURE

Technical Problem

An object of the present invention devised to solve the problem lies in a method and device for a configuration error management for a sidelink radio bearer. The technical problems solved by the present invention are not limited to the above technical problems and those skilled in the art may understand other technical problems from the following description.

Technical Solution

The object of the present invention can be achieved by providing a method for a User Equipment (UE) operating in a wireless communication system, the method comprising: receiving one or more D2D (Device to Device) packets via a sidelink radio bearer; counting erroneous D2D packets among the one or more D2D packets; and detecting configuration error for the sidelink radio bearer if a number of the counted erroneous D2D packets is equal to or larger than a threshold.

Preferably, the UE counts only consecutive erroneous D2D packets when the erroneous D2D packets are counted.

Preferably, the counted erroneous D2D packets are received consecutively if the configuration error is detected.

Preferably, the counted erroneous D2D packets are received within a predefined time period.

Preferably, the erroneous D2D packets are counted in only a RLC (Radio Link Control) entity, only a PDCP (Packet Data Convergence Protocol) entity or both of the RLC entity and the PDCP entity.

Preferably, the one or more D2D packets are counted as the erroneous D2D packets in one of following cases: i) when header decompression failure occurs in a PDCP entity of the sidelink radio bearer, or ii) when a PDCP PDU (Protocol Data Unit) that contains reserved or invalid values is received in the PDCP entity of the sidelink radio bearer, or iii) when a RLC PDU that contains reserved or invalid values is received in a RLC entity of the sidelink radio bearer.

Preferably, the threshold is configured independently for each sidelink radio bearer, or commonly for all sidelink radio bearers.

Preferably, the threshold is received from a network or a peer UE directly connected to the UE via a sidelink.

Preferably, the threshold is received as form of at least one of RRC (Radio Resource Control), PDCP (Packet Data Convergence Protocol), RLC (Radio Link Control), MAC (Medium Access Control), or PHY (PHYsical) signal.

Preferably, the method further comprises: transmitting a configuration error report to a network or a peer UE directly connected to the UE via a sidelink when the configuration error for the sidelink radio bearer is detected.

Preferably, the configuration error report includes an identifier of the sidelink radio bearer including at least one of a SourceID, a TargetID or a LCID (Logical Channel ID).

Preferably, the method further comprises: releasing a RLC and a PDCP entities for the sidelink radio bearer when the configuration error for the sidelink radio bearer is detected.

Preferably, the method further comprises: transmitting the configuration error recovery request to a network or a peer UE directly connected to the UE via a sidelink when the configuration error for the sidelink radio bearer is detected.

It is to be understood that both the foregoing general description and the following detailed description of the present invention are exemplary and explanatory and are intended to provide further explanation of the invention as claimed.

Advantageous Effects

According to the present invention, a configuration error for a sidelink radio bearer can be efficiently managed in D2D communication system. It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIGS. 15a to 15f are conceptual diagrams illustrating for UMD PDU;

FIGS. 18~21 are conceptual diagrams for a configuration error management for a sidelink radio bearer according to embodiments of the present invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
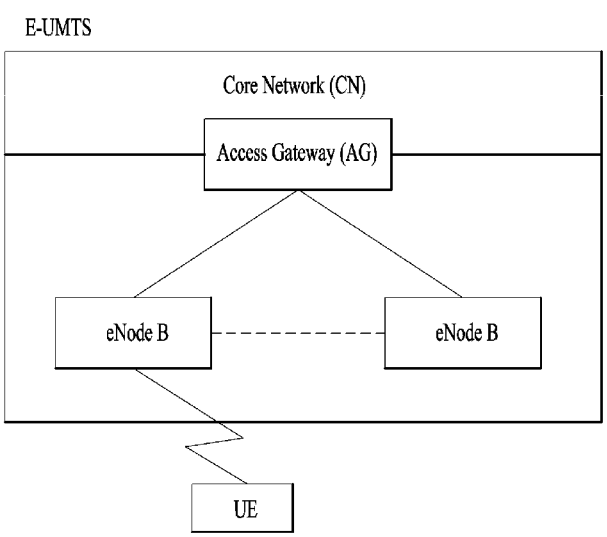
FIG. 1 is a diagram showing a network structure of an Evolved Universal Mobile Telecommunications System (E-UMTS) as an example of a wireless communication system.
Figure 2A:
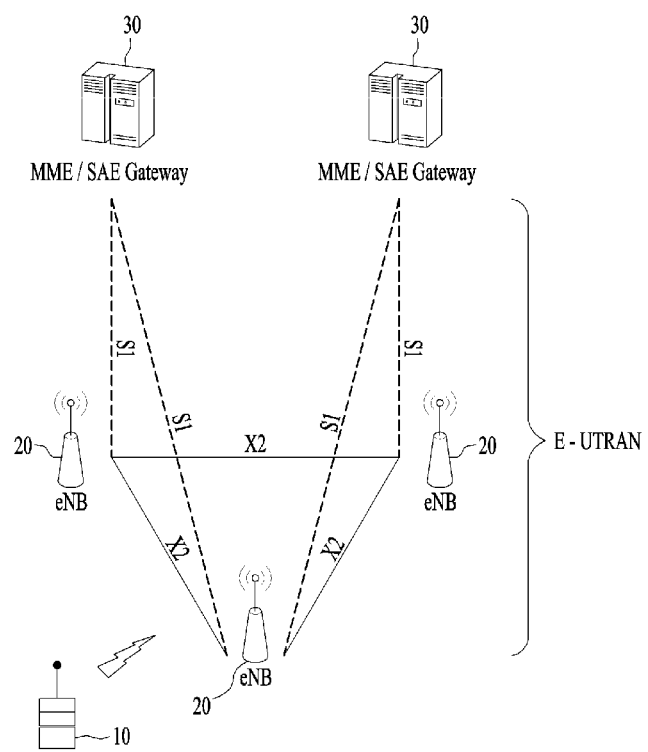
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
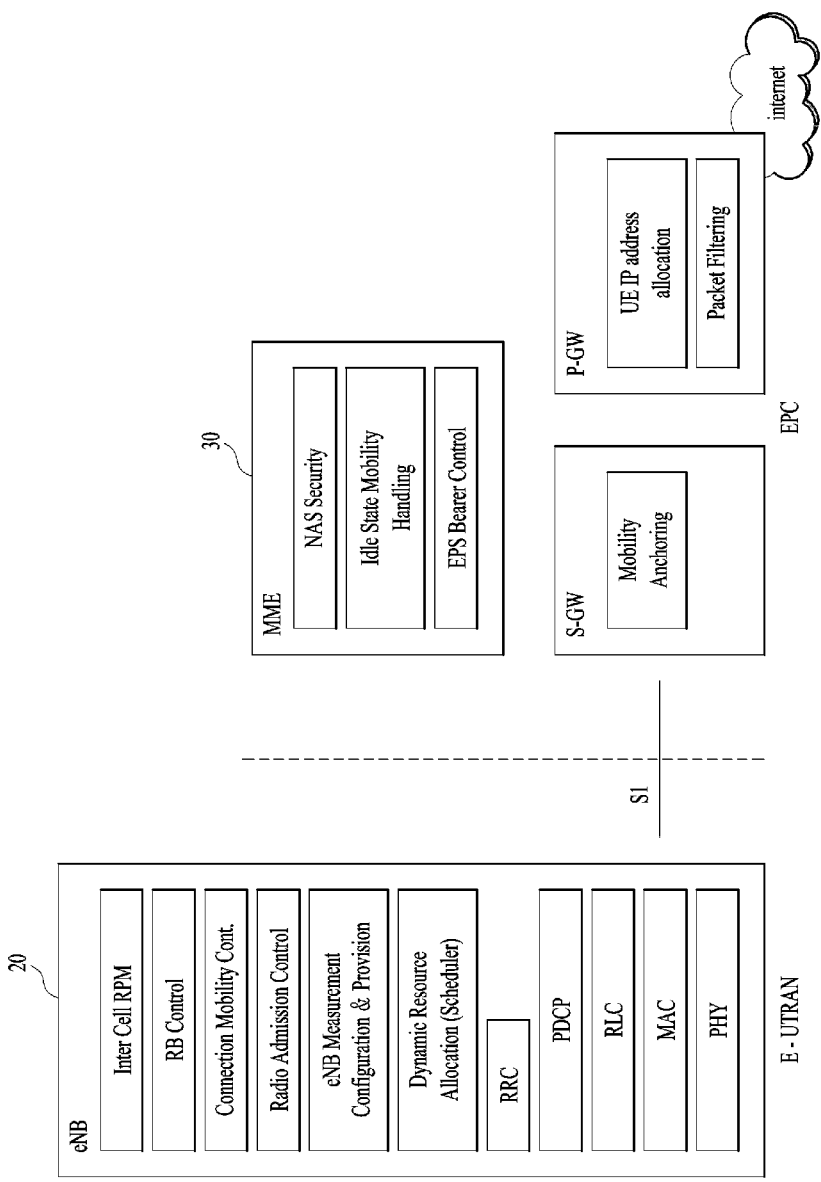
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
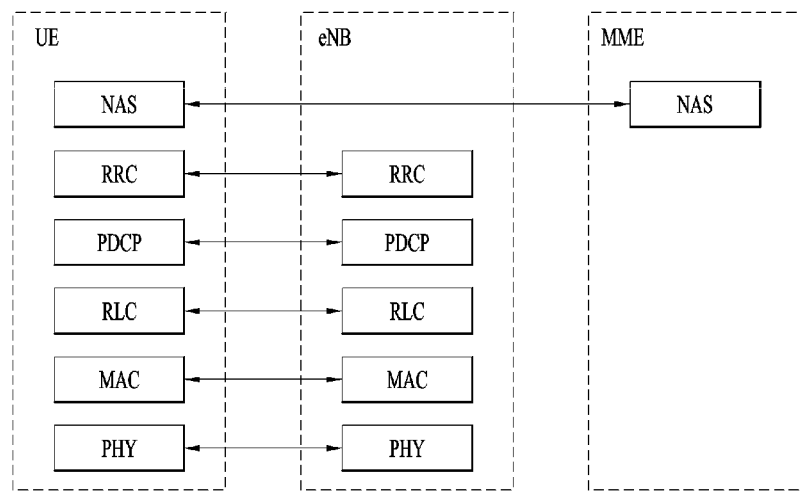
FIG. 3 is a diagram showing a control plane and a user plane of a radio interface protocol between a UE and an E-UTRAN based on a 3rd generation partnership project (3GPP) radio access network standard.
Figure 3:
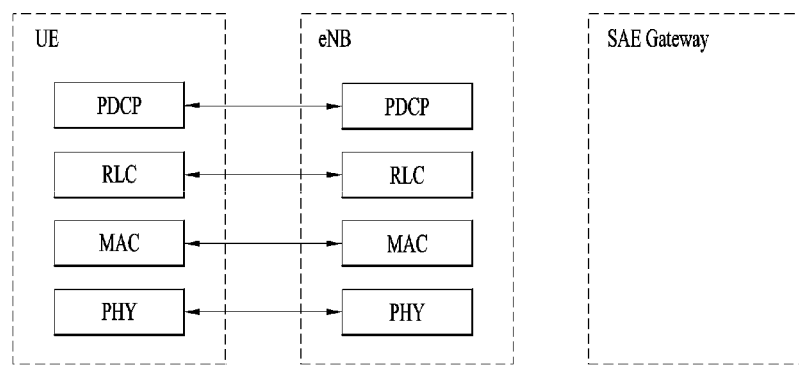

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
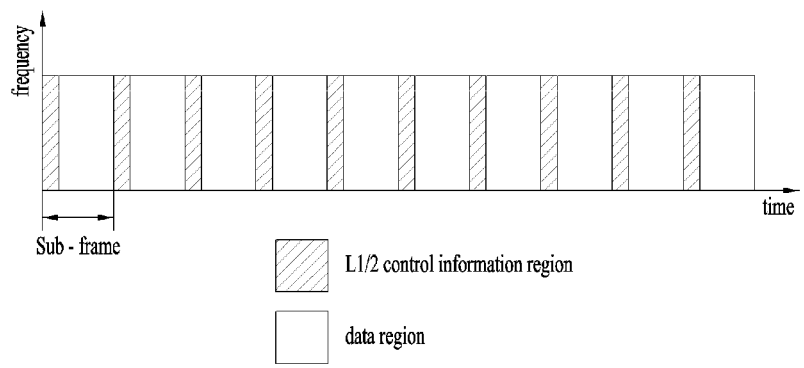
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
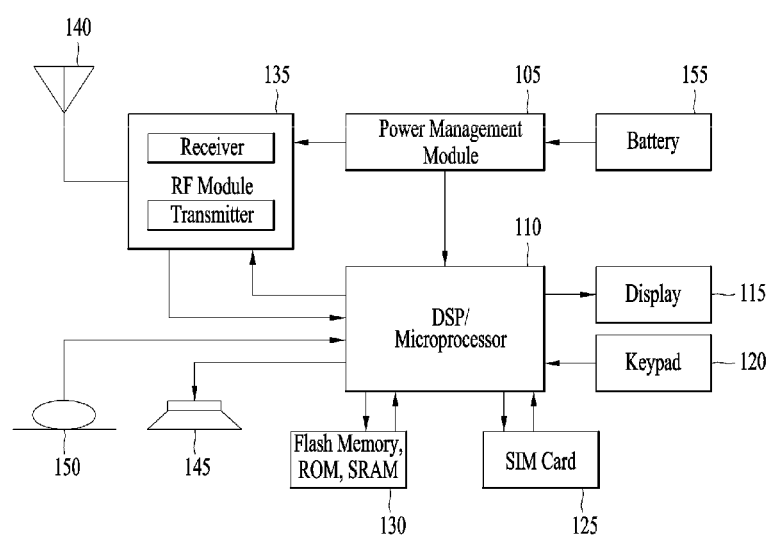
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transmiceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Recently, Proximity-based Service (ProSe) has been discussed in 3GPP. The ProSe enables different UEs to be connected (directly) each other (after appropriate procedure(s), such as authentication), through eNB only (but not further through Serving Gateway (SGW)/Packet Data Network Gateway (PDN-GW, PGW)), or through SGW/PGW. Thus, using the ProSe, device to device direct communication can be provided, and it is expected that every devices will be connected with ubiquitous connectivity. Direct communication between devices in a near distance can lessen the load of network. Recently, proximity-based social network services have come to public attention, and new kinds of proximity-based applications can be emerged and may create new business market and revenue. For the first step, public safety and critical communication are required in the market. Group communication is also one of key components in the public safety system. Required functionalities are: Discovery based on proximity, Direct path communication, and Management of group communications.

Use cases and scenarios are for example: i) Commercial/social use, ii) Network offloading, iii) Public Safety, iv) Integration of current infrastructure services, to assure the consistency of the user experience including reachability and mobility aspects, and v) Public Safety, in case of absence of EUTRAN coverage (subject to regional regulation and operator policy, and limited to specific public-safety designated frequency bands and terminals)

Figure 6:
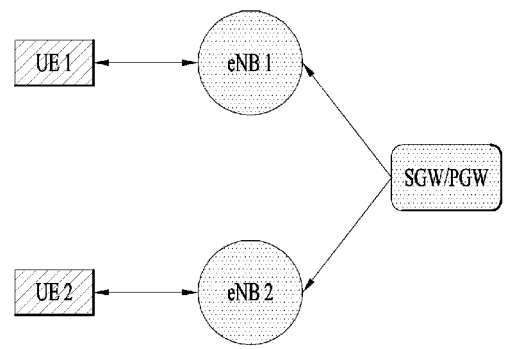
FIG. 6 is an example of default data path for a normal communication.

FIG. 6 is an example of default data path for communication between two UEs. With reference to FIG. 6, even when two UEs (e.g., UE1, UE2) in close proximity communicate with each other, their data path (user plane) goes via the operator network. Thus a typical data path for the communication involves eNB(s) and/or Gateway(s) (GW(s)) (e.g., SGW/PGW).

Figure 7:
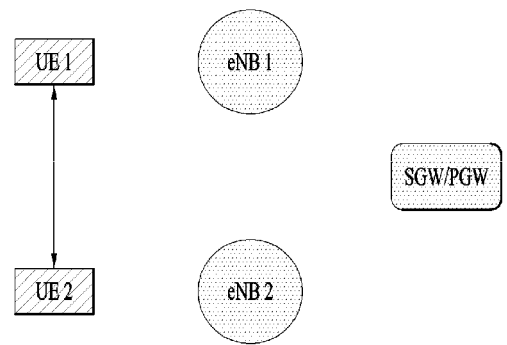
FIGS. 7~8 are examples of data path scenarios for a proximity communication.
Figure 8:
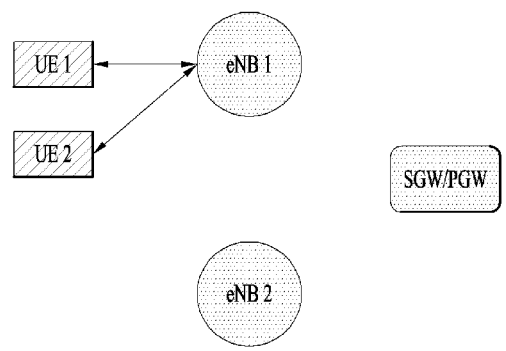

FIGS. 7 and 8 are examples of data path scenarios for a proximity communication. If wireless devices (e.g., UE1, UE2) are in proximity of each other, they may be able to use a direct mode data path (FIG. 7) or a locally routed data path (FIG. 8). In the direct mode data path, wireless devices are connected directly each other (after appropriate procedure(s), such as authentication), without eNB and SGW/PGW. In the locally routed data path, wireless devices are connected each other through eNB only.

Figure 9:
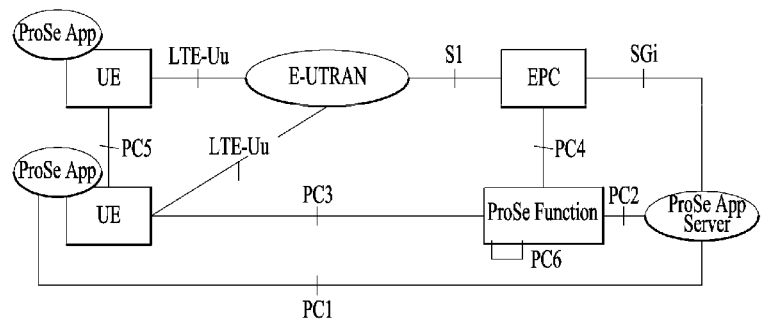
FIG. 9 is a conceptual diagram illustrating for a non-roaming reference architecture.

FIG. 9 is a conceptual diagram illustrating for a non-roaming reference architecture.

PC1 to PC 5 represent interfaces. PC1 is a reference point between a ProSe application in a UE and a ProSe App server. It is used to define application level signaling requirements. PC 2 is a reference point between the ProSe App Server and the ProSe Function. It is used to define the interaction between ProSe App Server and ProSe functionality provided by the 3GPP EPS via ProSe Function. One example may be for application data updates for a ProSe database in the ProSe Function. Another example may be data for use by ProSe App Server in interworking between 3GPP functionality and application data, e.g. name translation. PC3 is a reference point between the UE and ProSe Function. It is used to define the interaction between UE and ProSe Function. An example may be to use for configuration for ProSe discovery and communication. PC4 is a reference point between the EPC and ProSe Function. It is used to define the interaction between EPC and ProSe Function. Possible use cases may be when setting up a one-to-one communication path between UEs or when validating ProSe services (authorization) for session management or mobility management in real time.

PC5 is a reference point between UE to UE used for control and user plane for discovery and communication, for relay and one-to-one communication (between UEs directly and between UEs over LTE-Uu). Lastly, PC6 is a reference point may be used for functions such as ProSe Discovery between users subscribed to different PLMNs.

EPC (Evolved Packet Core) includes entities such as MME, S-GW, P-GW, PCRF, HSS etc. The EPC here represents the E-UTRAN Core Network architecture. Interfaces inside the EPC may also be impacted albeit they are not explicitly shown in FIG. 9.

Application servers, which are users of the ProSe capability for building the application functionality, e.g. in the Public Safety cases they can be specific agencies (PSAP) or in the commercial cases social media. These applications are defined outside the 3GPP architecture but there may be reference points towards 3GPP entities. The Application server can communicate towards an application in the UE.

Applications in the UE use the ProSe capability for building the application functionality. Example may be for communication between members of Public Safety groups or for social media application that requests to find buddies in proximity. The ProSe Function in the network (as part of EPS) defined by 3GPP has a reference point towards the ProSe App Server, towards the EPC and the UE.

The functionality may include but not restricted to e.g.:
Interworking via a reference point towards the 3rd party Applications
Authorization and configuration of the UE for discovery and Direct communication
Enable the functionality of the EPC level ProSe discovery
ProSe related new subscriber data and/handling of data storage; also handling of ProSe identities;
Security related functionality
Provide Control towards the EPC for policy related functionality
Provide functionality for charging (via or outside of EPC, e.g. offline charging)

Especially, the following identities are used for ProSe Direct Communication:
Source Layer-2 ID identifies a sender of a D2D packet at PC5 interface. The Source Layer-2 ID is used for identification of the receiver RLC UM entity;
Destination Layer-2 ID identifies a target of the D2D packet at PC5 interface. The Destination Layer-2 ID is used for filtering of packets at the MAC layer. The Destination Layer-2 ID may be a broadcast, groupcast or unicast identifier; and
SA L1 ID identifier in Scheduling Assignment (SA) at PC5 interface. SA L1 ID is used for filtering of packets at the physical layer. The SA L1 ID may be a broadcast, groupcast or unicast identifier.

No Access Stratum signaling is required for group formation and to configure Source Layer-2 ID and Destination Layer-2 ID in the UE. This information is provided by higher layers.

In case of groupcast and unicast, the MAC layer will convert the higher layer ProSe ID (i.e. ProSe Layer-2 Group ID and ProSe UE ID) identifying the target (Group, UE) into two bit strings of which one can be forwarded to the physical layer and used as SA L1 ID whereas the other is used as Destination Layer-2 ID. For broadcast, L2 indicates to L1 that it is a broadcast transmission using a pre-defined SA L1 ID in the same format as for group- and unicast.

Figure 10:
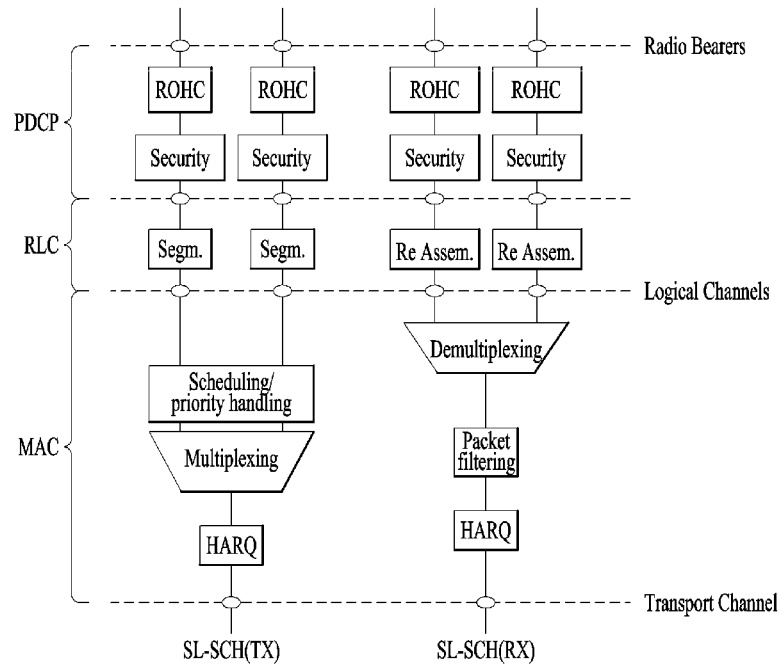
FIG. 10 is a conceptual diagram illustrating for a Layer 2 Structure for Sidelink.

FIG. 10 is a conceptual diagram illustrating for a Layer 2 structure for Sidelink.

The Sidelink is UE to UE interface for ProSe direct communication and ProSe Direct Discovery. Corresponds to the PC5 interface. The Sidelink comprises ProSe Direct Discovery and ProSe Direct Communication between UEs. The Sidelink uses uplink resources and physical channel structure similar to uplink transmissions. However, some changes, noted below, are made to the physical channels. E-UTRA defines two MAC entities; one in the UE and one in the E-UTRAN. These MAC entities handle the following transport channels additionally, i) sidelink broadcast channel (SL-BCH), ii) sidelink discovery channel (SL-DCH) and iii) sidelink shared channel (SL-SCH).

Basic transmission scheme: the Sidelink transmission uses the same basic transmission scheme as the UL transmission scheme. However, sidelink is limited to single cluster transmissions for all the sidelink physical channels. Further, sidelink uses a 1 symbol gap at the end of each sidelink sub-frame.

Physical-layer processing: the Sidelink physical layer processing of transport channels differs from UL transmission in the following steps:

i) Scrambling: for PSDCH and PSCCH, the scrambling is not UE-specific;

ii) Modulation: 64 QAM is not supported for Sidelink.

Physical Sidelink control channel: PSCCH is mapped to the Sidelink control resources. PSCCH indicates resource and other transmission parameters used by a UE for PSSCH.

Sidelink reference signals: for PSDCH, PSCCH and PSSCH demodulation, reference signals similar to uplink demodulation reference signals are transmitted in the 4th symbol of the slot in normal CP and in the 3rd symbol of the slot in extended cyclic prefix. The Sidelink demodulation reference signals sequence length equals the size (number of sub-carriers) of the assigned resource. For PSDCH and PSCCH, reference signals are created based on a fixed base sequence, cyclic shift and orthogonal cover code.

Physical channel procedure: for in-coverage operation, the power spectral density of the sidelink transmissions can be influenced by the eNB.

Figure 11A:
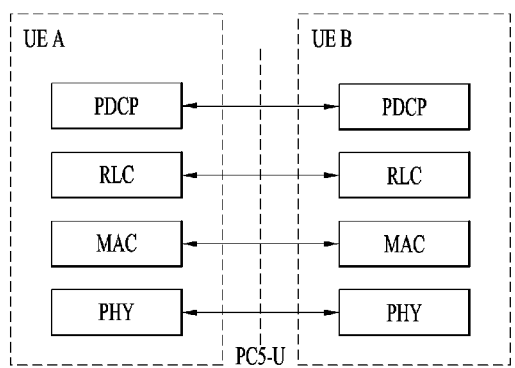
FIG. 11a is a conceptual diagram illustrating for User-Plane protocol stack for ProSe Direct Communication.
Figure 11B:
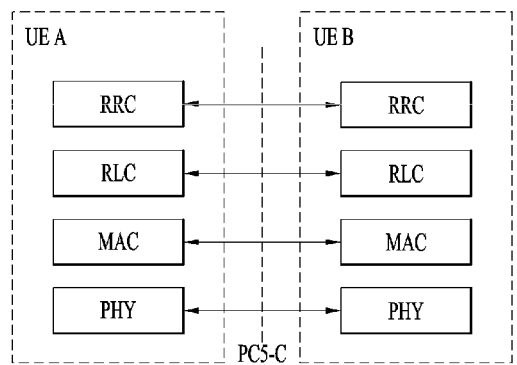
FIG. 11b is Control-Plane protocol stack for ProSe Direct Communication.

FIG. 11a is a conceptual diagram illustrating for User-Plane protocol stack for ProSe Direct Communication, and FIG. 11b is Control-Plane protocol stack for ProSe Direct Communication.

FIG. 11a shows the protocol stack for the user plane, where PDCP, RLC and MAC sublayers (terminate at the other UE) perform the functions listed for the user plane (e.g. header compression, HARQ retransmissions). The PC5 interface consists of PDCP, RLC, MAC and PHY as shown in FIG. 11a.

User plane details of ProSe Direct Communication: i) MAC sub header contains LCIDs (to differentiate multiple logical channels), ii) The MAC header comprises a Source Layer-2 ID and a Destination Layer-2 ID, iii) At MAC Multiplexing/demultiplexing, priority handling and padding are useful for ProSe Direct communication, iv) RLC UM is used for ProSe Direct communication, v) Segmentation and reassembly of RLC SDUs are performed, vi) A receiving UE needs to maintain at least one RLC UM entity per transmitting peer UE, vii) An RLC UM receiver entity does not need to be configured prior to reception of the first RLC UM data unit, and viii) U-Mode is used for header compression in PDCP for ProSe Direct Communication.

FIG. 11b shows the protocol stack for the control plane, where RRC, RLC, MAC, and PHY sublayers (terminate at the other UE) perform the functions listed for the control plane. A D2D UE does not establish and maintain a logical connection to receiving D2D UEs prior to a D2D communication.

Figure 12:
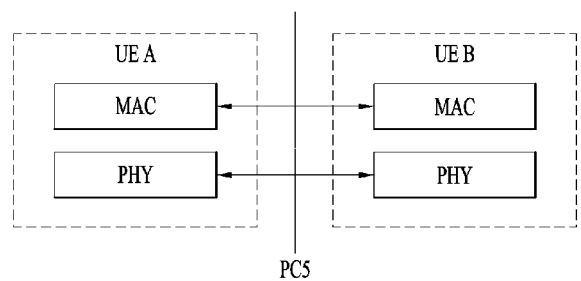
FIG. 12 is a conceptual diagram illustrating for a PC5 interface for ProSe Direct Discovery.

FIG. 12 is a conceptual diagram illustrating for a PC5 interface for ProSe Direct Discovery.

ProSe Direct Discovery is defined as the procedure used by the ProSe-enabled UE to discover other ProSe-enabled UE(s) in its proximity using E-UTRA direct radio signals via PC5.

Radio Protocol Stack (AS) for ProSe Direct Discovery is shown in FIG. 12.

The AS layer performs the following functions:

Interfaces with upper layer (ProSe Protocol): The MAC layer receives the discovery information from the upper layer (ProSe Protocol). The IP layer is not used for transmitting the discovery information.

Scheduling: The MAC layer determines the radio resource to be used for announcing the discovery information received from upper layer.

Discovery PDU generation: The MAC layer builds the MAC PDU carrying the discovery information and sends the MAC PDU to the physical layer for transmission in the determined radio resource. No MAC header is added.

There are two types of resource allocation for discovery information announcement.

Type 1: A resource allocation procedure where resources for announcing of discovery information are allocated on a non UE specific basis, further characterized by: i) The eNB provides the UE(s) with the resource pool configuration used for announcing of discovery information. The configuration may be signalled in SIB, ii) The UE autonomously selects radio resource(s) from the indicated resource pool and announce discovery information, iii) The UE can announce discovery information on a randomly selected discovery resource during each discovery period.

Type 2: A resource allocation procedure where resources for announcing of discovery information are allocated on a per UE specific basis, further characterized by: i) The UE in RRC CONNECTED may request resource(s) for announcing of discovery information from the eNB via RRC, ii) The eNB assigns resource(s) via RRC, iii) The resources are allocated within the resource pool that is configured in UEs for monitoring.

For UEs in RRC IDLE, the eNB may select one of the following options:

The eNB may provide a Type 1 resource pool for discovery information announcement in SIB. UEs that are authorized for Prose Direct Discovery use these resources for announcing discovery information in RRC IDLE.

The eNB may indicate in SIB that it supports D2D but does not provide resources for discovery information announcement. UEs need to enter RRC Connected in order to request D2D resources for discovery information announcement.

For UEs in RRC CONNECTED,

A UE authorized to perform ProSe Direct Discovery announcement indicates to the eNB that it wants to perform D2D discovery announcement.

The eNB validates whether the UE is authorized for ProSe Direct Discovery announcement using the UE context received from MME.

The eNB may configure the UE to use a Type 1 resource pool or dedicated Type 2 resources for discovery information announcement via dedicated RRC signaling (or no resource).

The resources allocated by the eNB are valid until a) the eNB de-configures the resource(s) by RRC signaling or b) the UE enters IDLE. (FFS whether resources may remain valid even in IDLE).

Receiving UEs in RRC IDLE and RRC CONNECTED monitor both Type 1 and Type 2 discovery resource pools as authorized. The eNB provides the resource pool configuration used for discovery information monitoring in SIB. The SIB may contain discovery resources used for announcing in neighbor cells as well.

Figure 13:
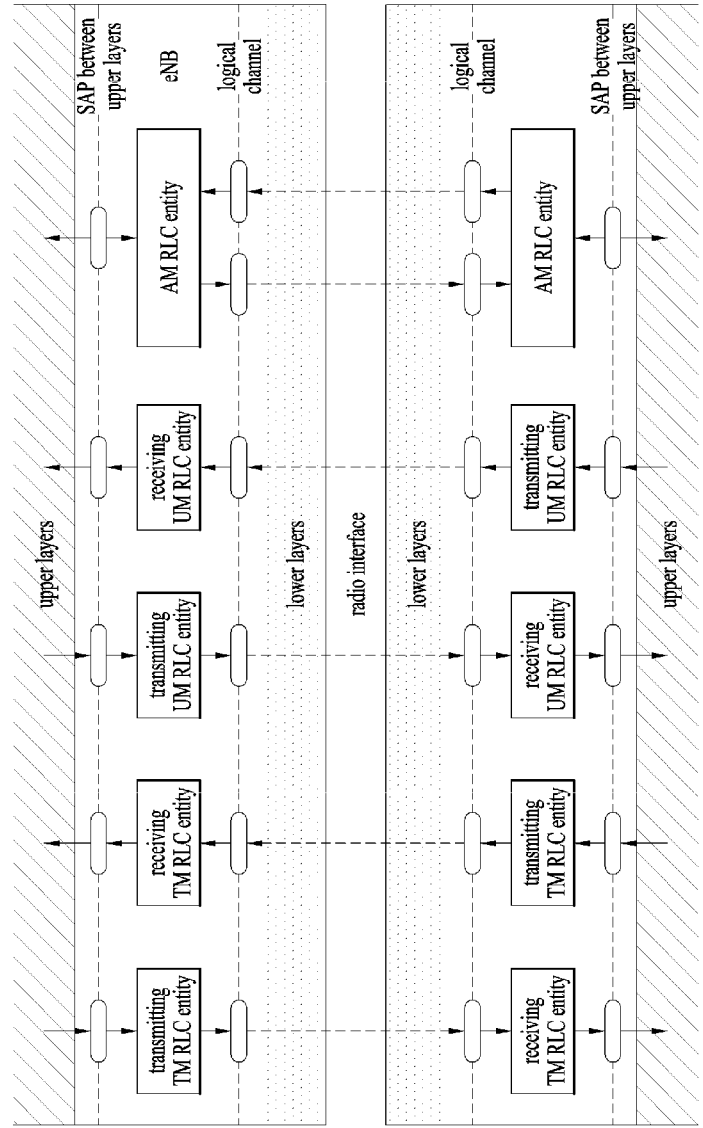
FIG. 13 is a conceptual diagram illustrating for overview model of the RLC sub layer.

FIG. 13 is a conceptual diagram illustrating for overview model of the RLC sub layer.

Functions of the RLC sub layer are performed by RLC entities. For a RLC entity configured at the eNB, there is a peer RLC entity configured at the UE and vice versa. For an RLC entity configured at the transmitting UE for STCH or SBCCH there is a peer RLC entity configured at each receiving UE for STCH or SBCCH.

An RLC entity receives/delivers RLC SDUs from/to upper layer and sends/receives RLC PDUs to/from its peer RLC entity via lower layers. An RLC PDU can either be a RLC data PDU or a RLC control PDU. If an RLC entity receives RLC SDUs from upper layer, it receives them through a single SAP between RLC and upper layer, and after forming RLC data PDUs from the received RLC SDUs, the RLC entity delivers the RLC data PDUs to lower layer through a single logical channel. If an RLC entity receives RLC data PDUs from lower layer, it receives them through a single logical channel, and after forming RLC SDUs from the received RLC data PDUs, the RLC entity delivers the RLC SDUs to upper layer through a single SAP between RLC and upper layer. If an RLC entity delivers/receives RLC control PDUs to/from lower layer, it delivers/receives them through the same logical channel it delivers/receives the RLC data PDUs through.

An RLC entity can be configured to perform data transfer in one of the following three modes: Transparent Mode (TM), Unacknowledged Mode (UM) or Acknowledged Mode (AM). Consequently, an RLC entity is categorized as a TM RLC entity, an UM RLC entity or an AM RLC entity depending on the mode of data transfer that the RLC entity is configured to provide.

A TM RLC entity is configured either as a transmitting TM RLC entity or a receiving TM RLC entity. The transmitting TM RLC entity receives RLC SDUs from upper layer and sends RLC PDUs to its peer receiving TM RLC entity via lower layers. The receiving TM RLC entity delivers RLC SDUs to upper layer and receives RLC PDUs from its peer transmitting TM RLC entity via lower layers.

An UM RLC entity is configured either as a transmitting UM RLC entity or a receiving UM RLC entity. The transmitting UM RLC entity receives RLC SDUs from upper layer and sends RLC PDUs to its peer receiving UM RLC entity via lower layers. The receiving UM RLC entity delivers RLC SDUs to upper layer and receives RLC PDUs from its peer transmitting UM RLC entity via lower layers.

An AM RLC entity consists of a transmitting side and a receiving side. The transmitting side of an AM RLC entity receives RLC SDUs from upper layer and sends RLC PDUs to its peer AM RLC entity via lower layers. The receiving side of an AM RLC entity delivers RLC SDUs to upper layer and receives RLC PDUs from its peer AM RLC entity via lower layers.

The following applies to all RLC entity types (i.e. TM, UM and AM RLC entity): i) RLC SDUs of variable sizes which are byte aligned (i.e. multiple of 8 bits) are supported, and ii) RLC PDUs are formed only when a transmission opportunity has been notified by lower layer (i.e. by MAC) and are then delivered to lower layer.

Figure 14:
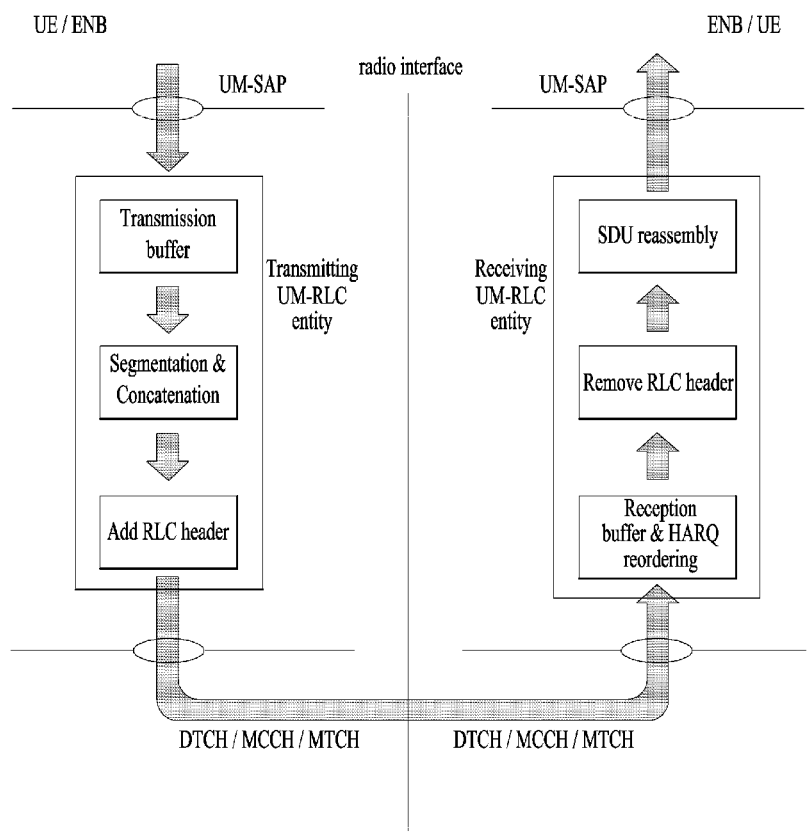
FIG. 14 is a conceptual diagram illustrating for model of two unacknowledged mode peer entities.

FIG. 14 is a conceptual diagram illustrating for model of two unacknowledged mode (UM) peer entities.

In UM (Unacknowledged Mode), in-sequence delivery to higher layers is provided, but no retransmissions of missing PDUs are requested. UM is typically used for services such as VoIP where error-free delivery is of less importance compared to short delivery time. TM (Transparent Mode), although supported, is only used for specific purposes such as random access.

Unacknowledged mode (UM) supports segmentation/reassembly and in-sequence delivery, but not retransmissions. This mode is used when error-free delivery is not required, for example voice-over IP, or when retransmissions cannot be requested, for example broadcast transmissions on MTCH and MCCH using MBSFN.

When a transmitting UM RLC entity forms UMD PDUs from RLC SDUs, the transmitting UM RLC entity may i) segment and/or concatenate the RLC SDUs so that the UMD PDUs fit within the total size of RLC PDU(s) indicated by lower layer at the particular transmission opportunity notified by lower layer; and ii) include relevant RLC headers in the UMD PDU.

When a receiving UM RLC entity receives UMD PDUs, the receiving UM RLC entity may i) detect whether or not the UMD PDUs have been received in duplication, and discard duplicated UMD PDUs; ii) reorder the UMD PDUs if they are received out of sequence; iii) detect the loss of UMD PDUs at lower layers and avoid excessive reordering delays; iv) reassemble RLC SDUs from the reordered UMD PDUs (not accounting for RLC PDUs for which losses have been detected) and deliver the RLC SDUs to upper layer in ascending order of the RLC SN; and v) discard received UMD PDUs that cannot be reassembled into a RLC SDU due to loss at lower layers of an UMD PDU which belonged to the particular RLC SDU.

At the time of RLC re-establishment, the receiving UM RLC entity may reassemble RLC SDUs from the UMD PDUs that are received out of sequence and deliver them to upper layer, if possible; ii) discard any remaining UMD PDUs that could not be reassembled into RLC SDUs; and iii) initialize relevant state variables and stop relevant timers.

At the time of RLC re-establishment, the receiving UM RLC entity may reassemble RLC SDUs from the UMD PDUs that are received out of sequence and deliver them to upper layer, if possible; ii) discard any remaining UMD PDUs that could not be reassembled into RLC SDUs; and iii) initialize relevant state variables and stop relevant timers.

The receiving UM RLC entity may maintain a reordering window according to state variable VR(UH) as follows:

i) a SN falls within the reordering window if (VR(UH)−UM_Window_Size)≤SN<VR(UH);

ii) a SN falls outside of the reordering window otherwise.

When receiving an UMD PDU from lower layer, the receiving UM RLC entity may either discard the received UMD PDU or place it in the reception buffer.

If the received UMD PDU was placed in the reception buffer, the receiving UM RLC may update state variables, reassemble and deliver RLC SDUs to upper layer and start/stop t-Reordering as needed.

When t-Reordering expires, the receiving UM RLC entity may update state variables, reassemble and deliver RLC SDUs to upper layer and start t-Reordering as needed When an UMD PDU with SN=x is received from lower layer, the receiving UM RLC entity may discard the received UMD PDU, if VR(UR)<x<VR(UH) and the UMD PDU with SN=x has been received before; or if (VR(UH)−UM_Window_Size)≤x<VR(UR).

Else, the receiving UM RLC entity may place the received UMD PDU in the reception buffer.

When an UMD PDU with SN=x is placed in the reception buffer, the receiving UM RLC entity may update VR(UH) to x+1 and reassemble RLC SDUs from any UMD PDUs with SN that falls outside of the reordering window, remove RLC headers when doing so and deliver the reassembled RLC SDUs to upper layer in ascending order of the RLC SN if not delivered before, if x falls outside of the reordering window.

If VR(UR) falls outside of the reordering window, the receiving UM RLC entity may set VR(UR) to (VR(UH)−UM_Window_Size).

If the reception buffer contains an UMD PDU with SN=VR(UR), the receiving UM RLC entity may update VR(UR) to the SN of the first UMD PDU with SN>current VR(UR) that has not been received; and reassemble RLC SDUs from any UMD PDUs with SN<updated VR(UR), remove RLC headers when doing so and deliver the reassembled RLC SDUs to upper layer in ascending order of the RLC SN if not delivered before;

If t-Reordering is running and VR(UX)≤VR(UR); or if t-Reordering is running and VR(UX) falls outside of the reordering window and VR(UX) is not equal to VR(UH), the receiving UM RLC entity may stop and reset t-Reordering.

If t-Reordering is not running (includes the case when t-Reordering is stopped due to actions above) and VR(UH)>VR(UR), the receiving UM RLC entity may start t-Reordering, and set VR(UX) to VR(UH).

When t-Reordering expires, the receiving UM RLC entity may update VR(UR) to the SN of the first UMD PDU with SN≥VR(UX) that has not been received; and reassemble RLC SDUs from any UMD PDUs with SN<updated VR(UR), remove RLC headers when doing so and deliver the reassembled RLC SDUs to upper layer in ascending order of the RLC SN if not delivered before.

If VR(UH)>VR(UR), the receiving UM RLC entity may start t-Reordering, and set VR(UX) to VR(UH).

Each transmitting UM RLC entity shall maintain the following state variables above mentioned:

a) VT(US): this state variable holds the value of the SN to be assigned for the next newly generated UMD PDU. It is initially set to 0, and is updated whenever the UM RLC entity delivers an UMD PDU with SN=VT(US).

Each receiving UM RLC entity shall maintain the following state variables above mentioned:

a) VR(UR)–UM receive state variable: this state variable holds the value of the SN of the earliest UMD PDU that is still considered for reordering. It is initially set to 0.

b) VR(UX)–UM t-Reordering state variable: this state variable holds the value of the SN following the SN of the UMD PDU which triggered t-Reordering.

c) VR(UH)–UM highest received state variable: this state variable holds the value of the SN following the SN of the UMD PDU with the highest SN among received UMD PDUs, and it serves as the higher edge of the reordering window. It is initially set to 0.

FIGS. 15a to 15f are conceptual diagrams illustrating for UMD PDU.

Figure 15A:
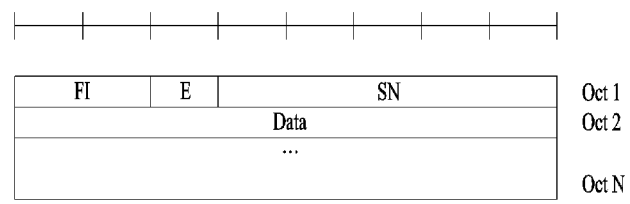
Figure 15B:
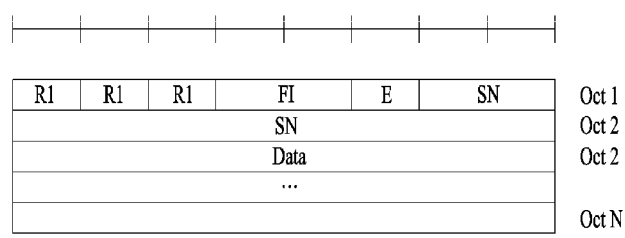
Figure 15C:
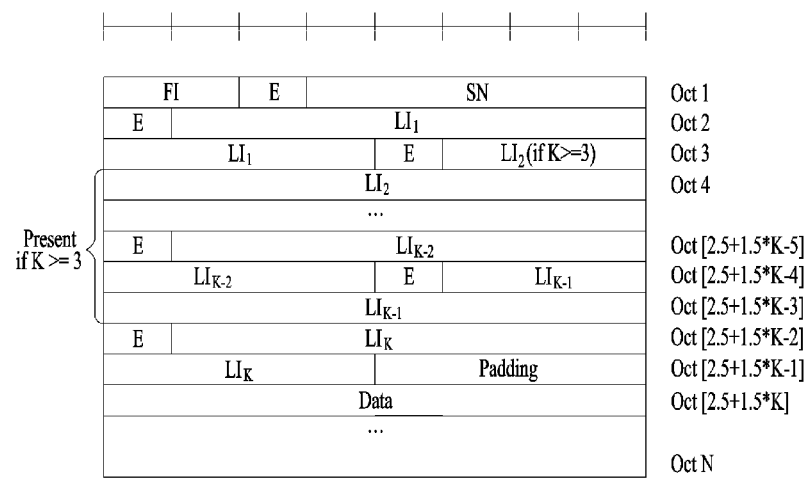
Figure 15D:
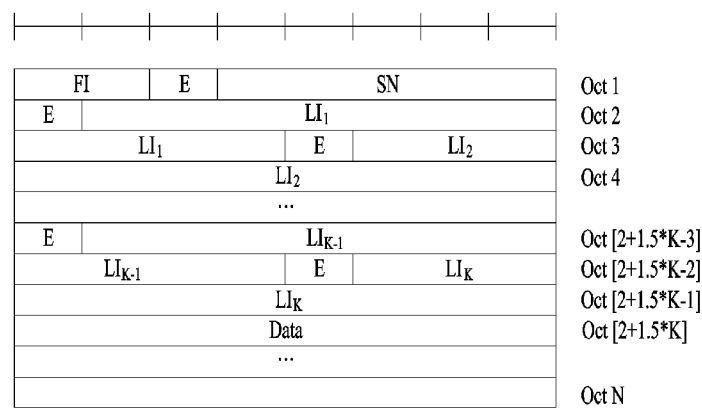

FIG. 15a is a diagram for a UMD PDU with 5 bit SN, FIG. 15b is a diagram for a UMD PDU with 10 bit SN, FIG. 15c is a diagram for a UMD PDU with 5 bit SN (Odd number of LIs, i.e. K=1, 3, 5, . . . ), FIG. 15d is a diagram for a UMD PDU with 5 bit SN (Even number of LIs, i.e. K=2, 4, 6, . . . ), FIG. 15e is a UMD PDU with 10 bit SN (Odd number of LIs, i.e. K=1, 3, 5, . . . ), and FIG. 15f is a diagram for a UMD PDU with 10 bit SN (Even number of LIs, i.e. K=2, 4, 6, . . . ).

An UMD PDU consists of a Data field and an UMD PDU header. UMD PDU header consists of a fixed part (fields that are present for every UMD PDU) and an extension part (fields that are present for an UMD PDU when necessary). The fixed part of the UMD PDU header itself is byte aligned and consists of a FI, an E and a SN. The extension part of the UMD PDU header itself is byte aligned and consists of E(s) and LI(s).

An UM RLC entity is configured by RRC to use either a 5 bit SN or a 10 bit SN. When the 5 bit SN is configured, the length of the fixed part of the UMD PDU header is one byte. When the 10 bit SN is configured, the fixed part of the UMD PDU header is identical to the fixed part of the AMD PDU header, except for D/C, RF and P fields all being replaced with R1 fields. The extension part of the UMD PDU header is identical to the extension part of the AMD PDU header (regardless of the configured SN size).

An UMD PDU header consists of an extension part only when more than one Data field elements are present in the UMD PDU, in which case an E and a LI are present for every Data field element except the last. Furthermore, when an UMD PDU header consists of an odd number of LI(s), four padding bits follow after the last LI.

In the definition of each field in FIG. 14a to FIG. 14f, the bits in the parameters are represented in which the first and most significant bit is the left most bit and the last and least significant bit is the rightmost bit. Unless mentioned otherwise, integers are encoded in standard binary encoding for unsigned integers.

Data field: The Data field elements are mapped to the Data field in the order which they arrive to the RLC entity at the transmitter. The granularity of the Data field size is one byte; and the maximum Data field size is the maximum TB size minus the sum of minimum MAC PDU header size and minimum RLC PDU header size. A UMD PDU segment is mapped to the Data field. Zero RLC SDU segments and one or more RLC SDUs, one or two RLC SDU segments and zero or more RLC SDUs; the RLC SDU segments are either mapped to the beginning or the end of the Data field, a RLC SDU or RLC SDU segment larger than 2047 octets can only be mapped to the end of the Data field. When there are two RLC SDU segments, they belong to different RLC SDUs.

Sequence number (SN) field: the SN field indicates the sequence number of the corresponding UMD or AMD PDU. For an AMD PDU segment, the SN field indicates the sequence number of the original AMD PDU from which the AMD PDU segment was constructed from. The sequence number is incremented by one for every UMD or AMD PDU. Length is 5 bits or 10 bits (configurable) for UMD PDU.

Extension bit (E) field: Length is 1 bit. The E field indicates whether Data field follows or a set of E field and LI field follows. The interpretation of the E field is provided in Table 1 and Table 2.

TABLE 1

| Value | Description |
| --- | --- |
| 0 | Data field follows from the octet following the fixed part of the header |
| 1 | A set of E field and LI field follows from the octet following the fixed part of the header |

TABLE 2

| Value | Description |
| --- | --- |
| 0 | Data field follows from the octet following the LI field following this E field |
| 1 | A set of E field and LI field follows from the bit following the LI field following this E field |

Length Indicator (LI) field: Length is 11 bits. The LI field indicates the length in bytes of the corresponding Data field element present in the RLC data PDU delivered/received by an UM or an AM RLC entity. The first LI present in the RLC data PDU header corresponds to the first Data field element present in the Data field of the RLC data PDU, the second LI present in the RLC data PDU header corresponds to the second Data field element present in the Data field of the RLC data PDU, and so on. The value 0 is reserved.

Framing Info (FI) field: Length is 2 bits. The FI field indicates whether a RLC SDU is segmented at the beginning and/or at the end of the Data field. Specifically, the FI field indicates whether the first byte of the Data field corresponds to the first byte of a RLC SDU, and whether the last byte of the Data field corresponds to the last byte of a RLC SDU. The interpretation of the FI field is provided in Table 3.

TABLE 3

| Value | Description |
|---|---|
| 00 | First byte of the Data field corresponds to the first byte of a RLC SDU.<br>Last byte of the Data field corresponds to the last byte of a RLC SDU. |
| 01 | First byte of the Data field corresponds to the first byte of a RLC SDU.<br>Last byte of the Data field does not correspond to the last byte of a RLC SDU. |
| 10 | First byte of the Data field does not correspond to the first byte of a RLC SDU.<br>Last byte of the Data field corresponds to the last byte of a RLC SDU. |
| 11 | First byte of the Data field does not correspond to the first byte of a RLC SDU.<br>Last byte of the Data field does not correspond to the last byte of a RLC SDU. |

Figure 16:
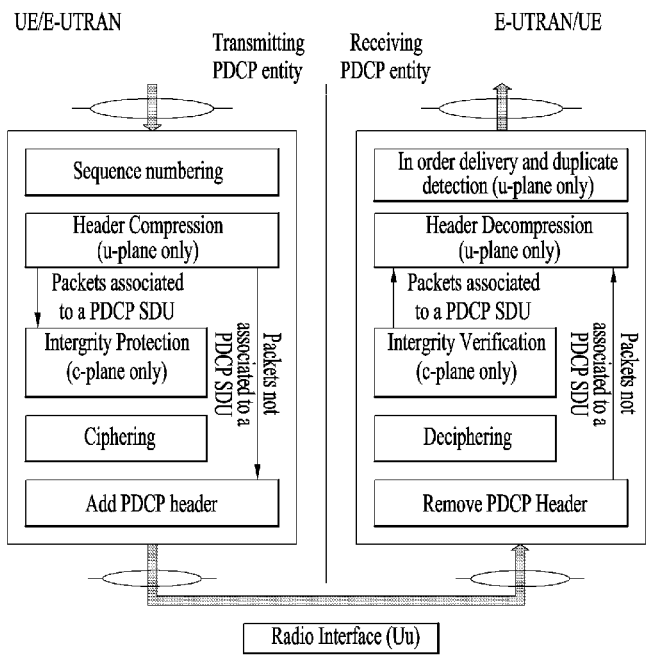
FIG. 16 is a conceptual diagram for functional view of a PDCP entity.

FIG. 16 is a conceptual diagram for functional view of a PDCP entity.

The PDCP entities are located in the PDCP sublayer. Several PDCP entities may be defined for a UE. Each PDCP entity carrying user plane data may be configured to use header compression. Each PDCP entity is carrying the data of one radio bearer. In this version of the specification, only the robust header compression protocol (ROHC), is supported. Every PDCP entity uses at most one ROHC compressor instance and at most one ROHC decompressor instance. A PDCP entity is associated either to the control plane or the user plane depending on which radio bearer it is carrying data for.

FIG. 16 represents the functional view of the PDCP entity for the PDCP sublayer, it should not restrict implementation. For RNs, integrity protection and verification are also performed for the u-plane.

UL Data Transfer Procedures:

At reception of a PDCP SDU from upper layers, the UE may start a discard timer associated with the PDCP SDU. For a PDCP SDU received from upper layers, the UE may associate a PDCP SN (Sequence Number) corresponding to Next_PDCP_TX_SN to the PDCP SDU, perform header compression of the PDCP SDU, perform integrity protection and ciphering using COUNT based on TX_HFN and the PDCP SN associated with this PDCP SDU, increment the Next_PDCP_TX_SN by one, and submit the resulting PDCP Data PDU to lower layer.

If the Next_PDCP_TX_SN is greater than Maximum_PDCP_SN, the Next_PDCP_TX_SN is set to '0' and TX_HFN is incremented by one.

DL Data Transfer Procedures:

For DRBs mapped on RLC UM, at reception of a PDCP Data PDU from lower layers, if received PDCP SN<Next_PDCP_RX_SN, the UE may increment RX_HFN by one, and decipher the PDCP Data PDU using COUNT based on RX_HFN and the received PDCP SN. And the UE may set Next_PDCP_RX_SN to the received PDCP SN+1. If Next_PDCP_RX_SN>Maximum_PDCP_SN, the UE may set Next_PDCP_RX_SN to 0, and increment RX_HFN by one.

The UE may perform header decompression (if configured) of the deciphered PDCP Data PDU, and deliver the resulting PDCP SDU to upper layer.

Figure 17:
FIG. 17 is a conceptual diagram for transmitting a RadioResourceConfigDedicated from E-UTRAN to a UE.

FIG. 17 is a conceptual diagram for transmitting a RadioResourceConfigDedicated from E-UTRAN to a UE.

The UE may release a PDCP entity, a RLC entity(s), a DTCH logical channel or drb-identity according to the RadioResourceConfigDedicated message, for each drb-Identity value included in the drb-ToAddModList that is part of the current UE configuration.

For each drb-Identity value included in the drb-ToReleaseList that is part of the current UE configuration (DRB release), or for each drb-identity value that is to be released as the result of full configuration option, the UE may release the PDCP entity, the RLC entity(s), or the DTCH logical channel.

The IE RadioResourceConfigDedicated is used to setup/modify/release RBs, to modify the MAC main configuration, to modify the SPS configuration and to modify dedicated physical configuration.

The IE RadioResourceConfigDedicated includes the drb-ToAddModList including pdcp-Config and rlc-Config, such as following Table 1.

TABLE 1

| RadioResourceConfigDedicated information element |
|---|
| -- ASN1START |
| |
| RadioResourceConfigDedicated ::=   SEQUENCE { |
| → srb-ToAddModList         → SRB-ToAddModList     → OPTIONAL, -- Cond HO-Conn |
| → drb-ToAddModList         → DRB-ToAddModList     → OPTIONAL, -- Cond HO- |
| ... |
| SRB-ToAddModList ::=   SEQUENCE (SIZE (1..2)) OF SRB-ToAddMod |
| |
| SRB-ToAddMod ::=   SEQUENCE { |
| → srb-Identity              → INTEGER (1..2), |
| → rlc-Config                → CHOICE { |
| → → explicitValue           → → RLC-Config, |
| → → defaultValue            → → NULL |
| → }   → → OPTIONAL,         → → → → → → →       → → → → → -- Cond Setup |
| → logicalChannelConfig      → CHOICE { |
| → → explicitValue           → → LogicalChannelConfig, |
| → → defaultValue            → → NULL |
| → }   → → OPTIONAL,         → → → → → → →       → → → → → -- Cond Setup |
| → ... |
| } |
| |
| DRB-ToAddModList ::=   SEQUENCE (SIZE (1..maxDRB)) OF DRB-ToAddMod |
| |
| DRB-ToAddMod ::=   SEQUENCE { |
| → eps-BearerIdentity        → INTEGER (0..15) → →    OPTIONAL, → → -- Cond DRB-Setup |

TABLE 1-continued

RadioResourceConfigDedicated information element

| | | |
|---|---|---|
| → drb-Identity → → → → → | → DRB-Identity, | |
| → pdcp-Config→ → → → →→ | → PDCP-Config→ → → → | OPTIONAL, → → --•Cond•PDCP |
| → rlc-Config→ → → → → → | → RLC-Config→ → → → | OPTIONAL, → → --•Cond•Setup |
| → logicalChannelIdentity→ → → | → INTEGER•(3..10)→ → → | OPTIONAL, → → --•Cond•DRB-Setup |
| → logicalChannelConfig → → → | → LogicalChannelConfig → | OPTIONAL, → → --•Cond•Setup |
| → ... | | |
| } | | |
| | | |
| DRB-ToReleaseList•::= → → → → | SEQUENCE•(SIZE•(1..maxDRB))•OF•DRB-Identity | |

The DRB-ToReleaseList includes sequence (size (1 . . . maxDRB)) of DRB-Identity. The parameter of maxDRB indicates maximum number of Data Radio Bearers.

In order to release L2 entities such as an RLC entity and a PDCP entity, a UE needs to be sure that there would be no more D2D data communication. For this, in the legacy system, the UE receives an RRC message (i.e., DRB-ToReleaseList information element in RadioResourceConfigDedicated) when a radio bearer is released by an eNB. The RRC message includes the identity of radio bearer to be released. Accordingly, the UE releases the L2 entities for the corresponding radio bearer.

In D2D communication, a transmitting UE (txUE) is identified by sourceID, a receiving UE is identified by targetID, and the logical channel is identified by LCID.

The layer2 (L2) entities such as a RLC entity and a PDCP entity are established per sidelink radio bearer (D2D-RB). In other words, the L2 entities are established for each [targetID, sourceID, LCID] combination. When the rxUE establishes the L2 entities, the configuration parameters are received from either the network or the txUE, including PDCP-SN-Size, headerCompression, SN-FieldLength, and T-Reordering. When the rxUE receives D2D packet, the rxUE deliver D2D packet to upper layer based on targetID, sourceID, and LCID. As long as the targetID, sourceID, and LCID are valid and L2 entities are established with correct configuration parameters, D2D packets will be successfully decoded.

However, there would be a case continuous L2 configuration error occurs even though the rxUE receives a D2D data with a valid targetID, sourceID, and LCID. This implies that the L2 entities are not established correctly: at least one of the L2 configuration parameters is not correctly received by the rxUE because the L2 configuration parameters are possible delivered by L2 signal. In this case, continuous error cannot be avoided if the L2 entities are released and newly established for the D2D-RB.

Figure 18:
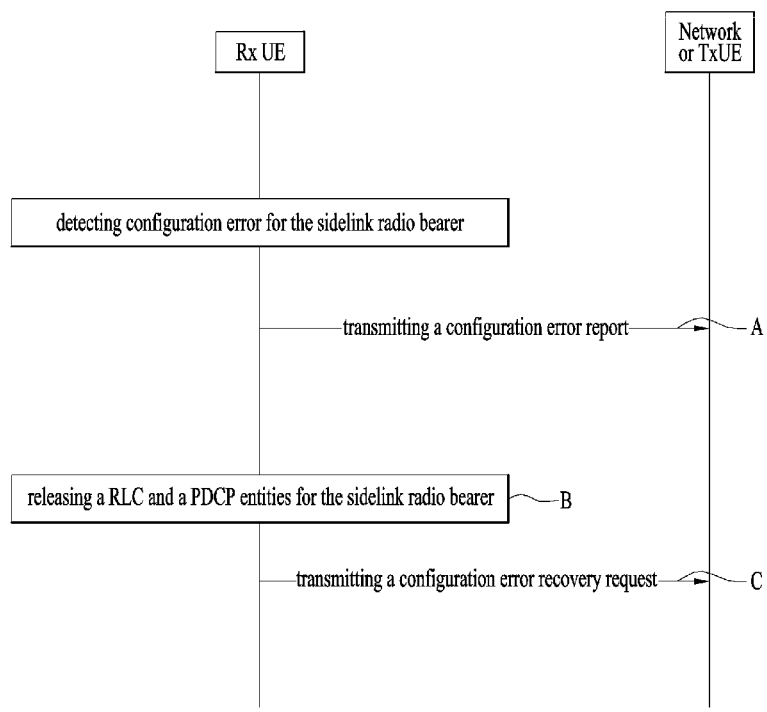

FIG. 18 is a conceptual diagram for a configuration error management for a sidelink radio bearer according to embodiments of the present invention.

In D2D communication, it is invented that the rxUE detects L2 CONfiguration ERror (L2 CONER) for a sidelink radio bearer (D2D-RB) based on erroneous D2D packets in corresponding RLC and/or PDCP entities. The txUE and rxUE establishes an RLC entity and a PDCP entity per a D2D-RB. A txUE is identified by Source Layer-2 ID (sourceID) and an rxUE is identified by Destination Layer-2 ID (targetID). A logical channel is identified by LCID.

Upon detecting L2 CONER of the D2D-RB, the rxUE may transmit the L2 CONER Report for the D2D-RB to the network or the txUE (A). Or, the rxUE may release a RLC and a PDCP entities for the D2D-RB (B). Additionally, the rxUE may transmit a configuration error recovery request to the network or the txUE and the network or txUE transmits L2 configuration information to rxUE for D2D-RB recovery (C).

Figure 19:
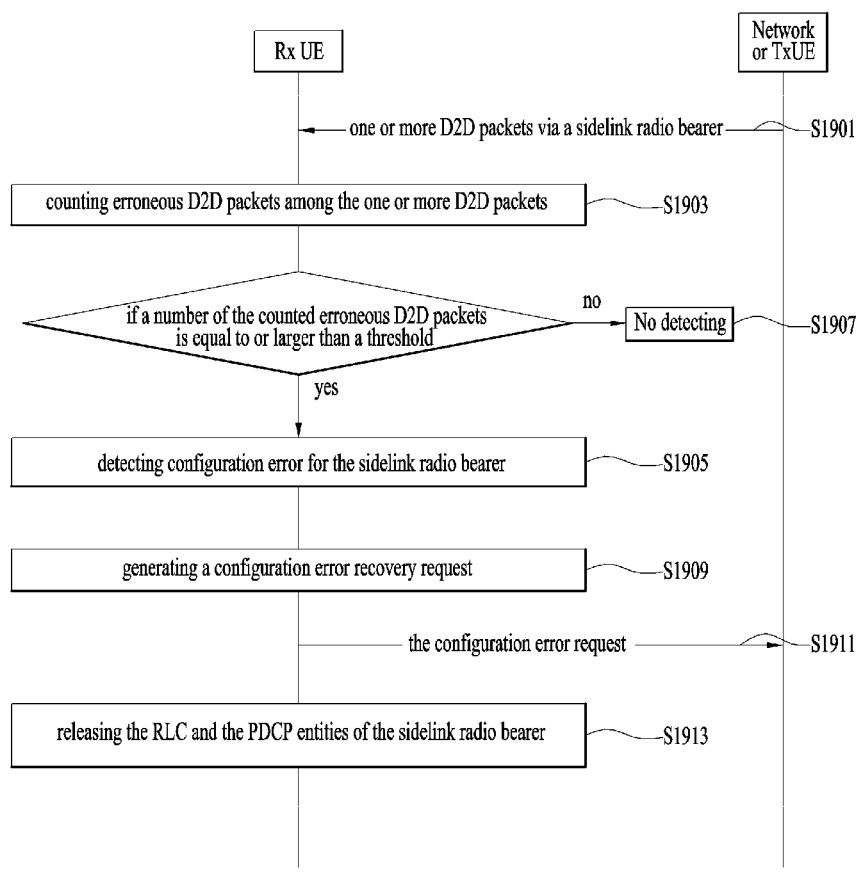

FIG. 19 is a conceptual diagram for a configuration error management for a sidelink radio bearer according to embodiments of the present invention.

When the rxUE receives one or more D2D packets via a D2D-RB (S1901), the UE counts erroneous D2D packets among the one or more D2D packets (S1903).

Preferably, the rxUE considers that the received D2D packet has the L2 CONER in the following cases: i) header decompression failure occurs in PDCP entity of the D2D-RB, ii) a PDCP PDU that contains reserved or invalid values is received in PDCP entity of the D2D-RB, or iii) a RLC PDU that contains reserved or invalid values is received in RLC entity of the D2D-RB.

The rxUE detects L2 CONER for the D2D-RB if the number of the counted erroneous D2D packets is equal to or larger than a threshold (S1905). If not, the rxUE doesn't consider the D2D-RB as the L2 CONER (S1907).

Preferably, for the D2D-RB, the rxUE detects the L2 CONER when the rxUE receives: i) a pre-defined number of erroneous D2D packets of the D2D-RB; or ii) a pre-defined number of consecutive erroneous D2D packets of the D2D-RB; or iii) a pre-defined number of erroneous D2D packets of the D2D-RB within a pre-defined time period; or iv) a pre-defined number of consecutive erroneous D2D packets of the D2D-RB within a pre-defined time period.

Preferably, the erroneous D2D packets are counted in only a RLC entity, only a PDCP entity or both of the RLC entity and the PDCP entity.

The number of erroneous D2D packets, the number of consecutive erroneous D2D packets, or the time period used for L2 CONER detection is configured by the network or the txUE. The network or the txUE transmits a separate value for each D2D-RB; or the network or the txUE transmits a common value for all D2D-RBs.

The network or the txUE transmits to the rxUE the value via at least one of an RRC (Radio Resource Control), PDCP (Packet Data Convergence Protocol), RLC (Radio Link Control), MAC (Medium Access Control), or PHY (PHYsical) signal.

The number of erroneous D2D packets, the number of consecutive erroneous D2D packets, or the time period used for L2 CONER detection is pre-defined in the specification. A separate value is pre-defined for each D2D-RB; or a common value is pre-defined for all D2D-RBs.

When the rxUE detects the L2 CONER for the D2D-RB, the rxUE generates configuration error report (L2 CONER Report) for the D2D-RB (S1909). And the rxUE transmits the L2 CONER Report to a network or a peer UE directly connected to the UE via a sidelink (S1911).

Preferably, the L2 CONER Report includes at least one of i) Identifier of the D2D-RB of detected L2 CONER, e.g., SourceID, TargetID, LCID, ii) Location of detected L2 CONER, e.g., PDCP or RLC; or iii) Type of detected L2 CONER, e.g., header decompression, reception of a PDCP PDU containing reserved or invalid values, or reception of a RLC PDU containing reserved or invalid values.

Preferably, the L2 CONER Report is transmitted via at least one of an RRC, PDCP, RLC, MAC, or PHY signal.

Preferably, the rxUE may transmit the L2 CONER Report one or more times to the network or the txUE. The number of transmission is configured by the network or the txUE, or pre-defined in the specification.

When the rxUE transmits L2 CONER Report for the D2D-RB to the network or to the txUE, the rxUE may release L2 entities for the D2D-RB (S1913).

Figure 20:
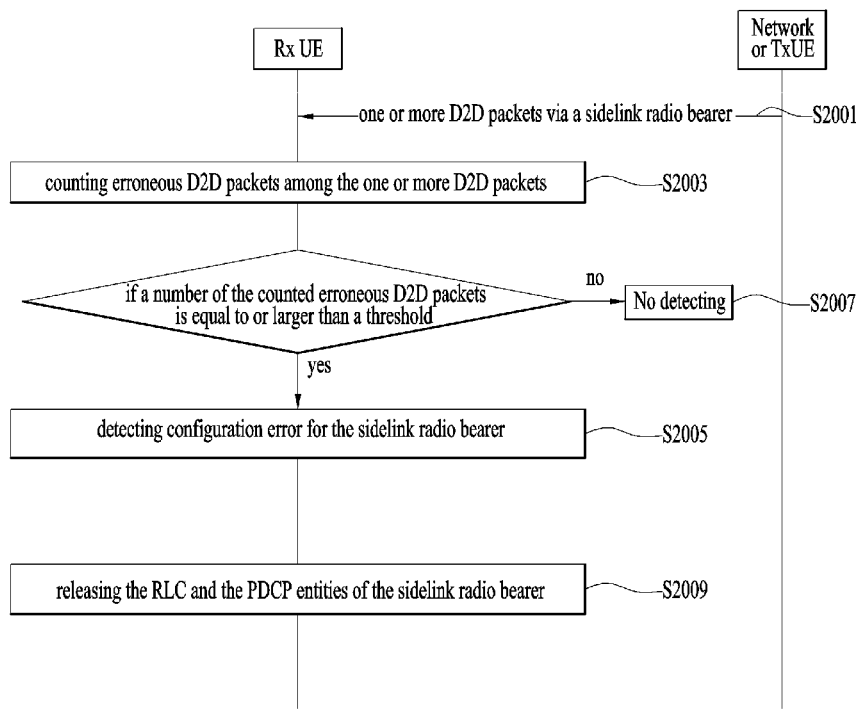

FIG. 20 is a conceptual diagram for a configuration error management for a sidelink radio bearer according to embodiments of the present invention.

When the rxUE receives one or more D2D packets via a D2D-RB (S2001), the UE counts erroneous D2D packets among the one or more D2D packets (S2003).

Preferably, the rxUE considers that the received D2D packet has the L2 CONER in the following cases: i) header decompression failure occurs in PDCP entity of the D2D-RB, ii) a PDCP PDU that contains reserved or invalid values is received in PDCP entity of the D2D-RB, or iii) a RLC PDU that contains reserved or invalid values is received in RLC entity of the D2D-RB.

The rxUE detects L2 CONER for the D2D-RB if the number of the counted erroneous D2D packets is equal to or larger than a threshold (S2005). If not, the rxUE doesn't consider the D2D-RB as the L2 CONER (S2007).

Preferably, for the D2D-RB, the rxUE detects the L2 CONER when the rxUE receives: i) a pre-defined number of erroneous D2D packets of the D2D-RB; or ii) a pre-defined number of consecutive erroneous D2D packets of the D2D-RB; or iii) a pre-defined number of erroneous D2D packets of the D2D-RB within a pre-defined time period; or iv) a pre-defined number of consecutive erroneous D2D packets of the D2D-RB within a pre-defined time period.

Preferably, the erroneous D2D packets are counted in only a RLC entity, only a PDCP entity or both of the RLC entity and the PDCP entity.

The number of erroneous D2D packets, the number of consecutive erroneous D2D packets, or the time period used for L2 CONER detection is configured by the network or the txUE. The network or the txUE transmits a separate value for each D2D-RB; or the network or the txUE transmits a common value for all D2D-RBs.

The network or the txUE transmits to the rxUE the value via at least one of an RRC, PDCP, RLC, MAC, or PHY signal.

The number of erroneous D2D packets, the number of consecutive erroneous D2D packets, or the time period used for L2 CONER detection is pre-defined in the specification. A separate value is pre-defined for each D2D-RB; or a common value is pre-defined for all D2D-RBs.

When the rxUE detects the L2 CONER for the D2D-RB, the rxUE may release L2 entities for the D2D-RB (S2009).

FIG. 21 is a conceptual diagram for a configuration error management for a sidelink radio bearer according to embodiments of the present invention.

When the rxUE receives one or more D2D packets via a D2D-RB (S2101), the UE counts erroneous D2D packets among the one or more D2D packets (S2103).

Preferably, the rxUE considers that the received D2D packet has the L2 CONER in the following cases: i) header decompression failure occurs in PDCP entity of the D2D-RB, ii) a PDCP PDU that contains reserved or invalid values is received in PDCP entity of the D2D-RB, or iii) a RLC PDU that contains reserved or invalid values is received in RLC entity of the D2D-RB.

The rxUE detects L2 CONER for the D2D-RB if the number of the counted erroneous D2D packets is equal to or larger than a threshold (S2105). If not, the rxUE doesn't consider the D2D-RB as the L2 CONER (S2107).

Preferably, for the D2D-RB, the rxUE detects the L2 CONER when the rxUE receives: i) a pre-defined number of erroneous D2D packets of the D2D-RB; or ii) a pre-defined number of consecutive erroneous D2D packets of the D2D-RB; or iii) a pre-defined number of erroneous D2D packets of the D2D-RB within a pre-defined time period; or iv) a pre-defined number of consecutive erroneous D2D packets of the D2D-RB within a pre-defined time period.

Preferably, the erroneous D2D packets are counted in only a RLC entity, only a PDCP entity or both of the RLC entity and the PDCP entity.

The number of erroneous D2D packets, the number of consecutive erroneous D2D packets, or the time period used for L2 CONER detection is configured by the network or the txUE. The network or the txUE transmits a separate value for each D2D-RB; or the network or the txUE transmits a common value for all D2D-RBs.

The network or the txUE transmits to the rxUE the value via at least one of an RRC, PDCP, RLC, MAC, or PHY signal.

The number of erroneous D2D packets, the number of consecutive erroneous D2D packets, or the time period used for L2 CONER detection is pre-defined in the specification. A separate value is pre-defined for each D2D-RB; or a common value is pre-defined for all D2D-RBs.

When the rxUE detects the L2 CONER for the D2D-RB, the rxUE may start a timer (L2 RecoveryTimer) (S2109) and generates a configuration error recovery request (L2 RecoveryRequest) (S2111).

Preferably, the rxUE maintains the L2 RecoveryTimer per D2D-RB and the rxUE maintains the L2 RecoveryTimer in a RRC, a PDCP, a RLC, a MAC, a PHY layer.

Preferably, the L2 RecoveryTimer is configured by the network or the txUE, i) the network the txUE transmits a separate value for each D2D-RB; or ii) the network the txUE transmits a separate value a common value for all D2D-RBs. The network or the txUE transmits to the rxUE the value of the L2 RecoveryTimer via RRC/PDCP/RLC/MAC/PHY signal.

Preferably, the L2 RecoveryTimer is specified in the specification. A separate value is pre-defined for each D2D-RB; or a separate value is pre-defined for all D2D-RBs.

The rxUE transmits the L2 RecoveryRequest to a network or a peer UE directly connected to the UE via a sidelink (S2113).

Preferably, the L2 RecoveryRequest includes at least one of i) identifier of the D2D-RB of detected L2 CONER, e.g., SourceID, TargetID, LCID; or ii) location of detected L2 CONER, e.g., PDCP or RLC; or iii) type of detected L2 CONER, e.g., header decompression, reception of a PDCP PDU containing reserved or invalid values, or reception of a RLC PDU containing reserved or invalid values.

Preferably, the rxUE transmits L2 RecoveryRequest to the network or the txUE by using at least one of an RRC, PDCP, RLC, MAC, or PHY signal.

Meanwhile, when the network or the txUE receives L2 RecoveryRequest from the rxUE, i) the network or the txUE checks the identifier of the D2D-RB; or ii) the network or the txUE checks the location of the L2 CONER; or iii) the network or the txUE checks the type of the L2 CONER; or iv) the network or the txUE considers that the RLC and PDCP entities of the indicated D2D-RB are configured with invalid configuration parameters. The network or the txUE transmits L2 configuration information for the indicated D2D-RB by using at least one of an RRC, PDCP, RLC, MAC, or PHY signal.

When the rxUE receives L2 configuration information for the D2D-RB from the network or the txUE (S2115), the rxUE stops the L2 RecoveryTimer of the D2D-RB (S2117), and establishes or re-establishes L2 entities of the D2D-RB according to the received L2 configuration information (S2119).

Preferably, the L2 configuration information includes at least one of PDCP-SN-Size, headerCompression, SN-Field-Length, and T-Reordering.

When the L2 RecoveryTimer expires for the D2D-RB, the rx UE considers L2 recovery fails for the D2D-RB, and may transmit L2 RecoveryFail indicator to the network or the txUE (S2121).

Preferably, the L2 RecoveryFail indicator includes an identifier of the sidelink radio bearer including at least one of a SourceID, a TargetID or a LCID.

Preferably, the rxUE transmits the L2 RecoveryFail indicator by using at least one of an RRC, PDCP, RLC, MAC, or PHY signal.

The rxUE releases the RLC and the PDCP entities of the sidelink radio bearer after the recovery fail indicator is transmitted (S2113).

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

What is claimed is:

1. A method for a User Equipment (UE) operating in a wireless communication system, the method comprising:
receiving a plurality of Device to Device (D2D) packets via a sidelink radio bearer;
counting erroneous D2D packets among the plurality of D2D packets;
detecting configuration error for the sidelink radio bearer if a number of the counted erroneous D2D packets is equal to or larger than a threshold;
starting a timer when the configuration error for the sidelink radio bearer is detected;
generating a configuration error recovery request including an identifier of the sidelink radio bearer;
transmitting the configuration error recovery request to a network or a peer UE directly connected to the UE via the sidelink radio bearer;
stopping the timer and re-establishing a Radio Link Control (RLC) entity and a Packet Data Convergence Protocol (PDCP) entity of the sidelink radio bearer according to configuration information received in response to the configuration error recovery request, when the configuration information is received before the timer is expired; and
transmitting a recovery fail indicator to the network or the peer UE when the configuration information is not received before the timer is expired.

2. The method according to claim 1,
wherein the UE counts only consecutive erroneous D2D packets when the erroneous D2D packets are counted.

3. The method according to claim 1,
wherein the counted erroneous D2D packets are received consecutively if the configuration error is detected.

4. The method according to claim 1, wherein the counted erroneous D2D packets are received within a predefined time period.

5. The method according to claim 1,
wherein the erroneous D2D packets are counted in only the RLC entity, only the PDCP entity or both of the RLC entity and the PDCP entity.

6. The method according to claim 1,
wherein D2D packets of the plurality of D2D packets are counted as the erroneous D2D packets in one of following cases:
when header decompression failure occurs in the PDCP entity of the sidelink radio bearer;
when a PDCP Protocol Data Unit (PDU) that contains reserved or invalid values is received in the PDCP entity of the sidelink radio bearer; or
when a RLC PDU that contains reserved or invalid values is received in the RLC entity of the sidelink radio bearer.

7. The method according to claim 1,
wherein the threshold is configured independently for each sidelink radio bearer, or commonly for all sidelink radio bearers.

8. The method according to claim 1,
wherein the threshold is received from the network or the peer UE.

9. The method according to claim 1,
wherein threshold information is received in at least one of Radio Resource Control (RRC) signal, PDCP signal, RLC signal, Medium Access Control (MAC) signal, or PHYsical (PHY) signal.

10. The method according to claim 1, further comprising:
releasing the RLC entity and the PDCP entity of the sidelink radio bearer when the configuration error for the sidelink radio bearer is detected.

11. The method according to claim 1,
wherein the identifier of the sidelink radio bearer includes at least one of a Source ID, a Target ID or a LCID.

12. A User Equipment (UE) for operating in a wireless communication system, the UE comprising:
a Radio Frequency (RF) module; and
a processor operably coupled with the RF module and configured to:
receive a plurality of Device to Device (D2D) packets via a sidelink radio bearer;
count erroneous D2D packets among the plurality of D2D packets;
detect configuration error for the sidelink radio bearer if a number of the counted erroneous D2D packets is equal to or larger than a threshold;
start a timer when the configuration error for the sidelink radio bearer is detected;
generate a configuration error recovery request including an identifier of the sidelink radio bearer;
transmit the configuration error recovery request to a network or a peer UE directly connected to the UE via the sidelink radio bearer;
stop the timer and re-establish a Radio Link Control (RLC) entity and a Packet Data Convergence Protocol (PDCP) entity of the sidelink radio bearer according to configuration information received in response to the configuration error recovery request, when the configuration information is received before the timer is expired; and
transmit a recovery fail indicator to the network or the peer UE when the configuration information is not received before the timer is expired.

13. The UE according to claim 12,
wherein the UE counts only consecutive erroneous D2D packets when the erroneous D2D packets are counted.

14. The UE according to claim 12,
wherein the counted erroneous D2D packets are received consecutively if the configuration error is detected.

15. The UE according to claim 12,
wherein the counted erroneous D2D packets are received within a predefined time period.

16. The UE according to claim 12,
wherein the erroneous D2D packets are counted in only the RLC entity, only the PDCP entity or both of the RLC entity and the PDCP entity.

17. The UE according to claim 12,
wherein D2D packets of the plurality of D2D packets are counted as the erroneous D2D packets in one of following cases:
when header decompression failure occurs in the PDCP entity of the sidelink radio bearer;
when a PDCP Protocol Data Unit (PDU) that contains reserved or invalid values is received in the PDCP entity of the sidelink radio bearer; or
when a RLC PDU that contains reserved or invalid values is received in the RLC entity of the sidelink radio bearer.

* * * * *